US012770212B2

(12) United States Patent
Mukherjee et al.

(10) Patent No.: US 12,770,212 B2
(45) Date of Patent: Oct. 20, 2026

(54) GRAPHICS PROCESSING UNIT (GPU) OPTIMIZATION USING HASH TABLES

(71) Applicant: Bank of America Corporation, Charlotte, NC (US)

(72) Inventors: Maharaj Mukherjee, Poughkeepsie, NY (US); Carl M. Benda, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 133 days.

(21) Appl. No.: 18/672,167

(22) Filed: May 23, 2024

(65) Prior Publication Data

US 2025/0363584 A1 Nov. 27, 2025

(51) Int. Cl.
*G06T 1/20* (2006.01)

(52) U.S. Cl.
CPC ...................................... *G06T 1/20* (2013.01)

(58) Field of Classification Search
None
See application file for complete search history.

(56) References Cited

U.S. PATENT DOCUMENTS 8,854,385 B1 10/2014 Craik et al.
9,836,354 B1 12/2017 Potlapally et al.
10,878,806 B1 12/2020 Li
11,467,870 B2 10/2022 Acharya et al.
2011/0209213 A1* 8/2011 Wooten .................. G06F 21/72 726/21
2011/0264626 A1 10/2011 Gautam et al.
2013/0039584 A1* 2/2013 Harmanci .............. G06F 16/51 382/197
2013/0266195 A1* 10/2013 Shiell .................. G06V 40/172 382/118
2015/0089151 A1* 3/2015 Bolz .................. G06F 12/0815 711/141
2015/0095346 A1* 4/2015 Kimmel ................ G06F 3/0641 707/747

(Continued)

OTHER PUBLICATIONS

Tang, Zhenheng; FusionAI: Decentralized Training and Deploying LLMs with Massive Consumer-Level GPUs; Sep. 2023; Symposium on Large Language Models (LLM-IJCAI workshop 2023); p. 1-8; https://arxiv.org/pdf/2309.01172 (Year: 2023).*

*Primary Examiner* — Joni Hsu
(74) *Attorney, Agent, or Firm* — Banner & Witcoff, Ltd.

(57) ABSTRACT

A computing platform may receive a GPU processing request for processing by a GPU system. The computing platform may identify an operation requested by the GPU processing request. The computing platform may identify whether or not the operation is stored in a hash table. Based on identifying that the operation is not stored in the hash table, the computing platform may identify whether an approximate match of the operation is stored in the hash table. Based on identifying that the approximate match is stored in the hash table, the computing platform may identify a first key stored, in the hash table, along with the approximate match. The computing platform may identify, using the first key, a location of a solution to the approximate match of the operation. The computing platform may obtain, from the location, the solution to the approximate match of the operation, and may apply the solution.

11 Claims, 7 Drawing Sheets

(56) References Cited

U.S. PATENT DOCUMENTS

| | | | |
|---|---|---|---|
| 2015/0145866 A1 | | 5/2015 | Wu et al. |
| 2016/0027143 A1 | | 1/2016 | Amidei et al. |
| 2016/0125566 A1 | | 5/2016 | Kim et al. |
| 2016/0378754 A1 | | 12/2016 | Kamath et al. |
| 2018/0101742 A1 | * | 4/2018 | Burge ................. G06F 16/5838 |
| 2018/0284871 A1 | | 10/2018 | Surti et al. |
| 2018/0365019 A1 | | 12/2018 | Rossi et al. |
| 2019/0139263 A1 | | 5/2019 | Gruber et al. |
| 2019/0197651 A1 | | 6/2019 | Johnson et al. |
| 2020/0125368 A1 | | 4/2020 | Kaldewey et al. |
| 2021/0026707 A1 | * | 1/2021 | Rosenberg ............ G06F 9/5005 |
| 2021/0057099 A1 | * | 2/2021 | Neumann .............. G16H 50/20 |
| 2021/0133917 A1 | | 5/2021 | Tu et al. |
| 2022/0374304 A1 | | 11/2022 | Beaumont |
| 2022/0414222 A1 | | 12/2022 | Phan et al. |
| 2023/0113180 A1 | | 4/2023 | Srinivasan et al. |
| 2023/0333900 A1 | * | 10/2023 | Ross ..................... G06F 9/5066 |
| 2025/0077435 A1 | * | 3/2025 | Pham .................. G06F 12/0862 |
| 2025/0199774 A1 | * | 6/2025 | Grigore .................. G06N 3/006 |
| 2025/0279111 A1 | * | 9/2025 | Kenefick ............... G10L 21/034 |

* cited by examiner

GRAPHICS PROCESSING UNIT (GPU) OPTIMIZATION USING HASH TABLES

BACKGROUND

In some instances, generative artificial intelligence (AI) models and large language models (LLM) may be supported by graphics processing unit (GPU) banks, which may enable the creation of foundational models and/or model customization. Without the parallelization offered by such GPUs, it may be difficult to create such foundational models, as they may incorporate millions of different features. In some instances, however, it may be difficult to obtain such GPUs and/or the corresponding semi-conductor materials used to create such GPUs. Due to the increasing demand of larger and larger foundational models and the supply shortage of the supporting GPUs, it may be important to be as efficient as possible with any available GPUs.

SUMMARY

Aspects of the disclosure provide effective, efficient, scalable, and convenient technical solutions that address and overcome the technical problems associated with optimizing use of graphics processing units (GPU) processing various operations. In accordance with one or more embodiments of the disclosure, a computing platform comprising at least one processor, a communication interface, and memory storing computer-readable instructions may receive a graphics processing unit (GPU) processing request for processing by a GPU system. The computing platform may identify an operation requested by the GPU processing request. The computing platform may identify whether or not the operation is stored in a hash table. Based on identifying that the operation is not stored in the hash table, the computing platform may identify whether an approximate match of the operation is stored in the hash table. Based on identifying that the approximate match is stored in the hash table, the computing platform may identify a first key stored, in the hash table, along with the approximate match. The computing platform may identify, using the first key, a location of a solution to the approximate match of the operation. The computing platform may obtain, from the location, the solution to the approximate match of the operation, and apply the solution.

In one or more instances, the hash table may be pre-populated with a plurality of operations and corresponding solution keys. In one or more instances, based on identifying that the operation is stored in the hash table, the computing platform may identify a second key stored, in the hash table, along with the matching operation.

In one or more examples, based on identifying that the approximate match is not stored in the hash table, the computing platform may: 1) send an operation execution request to a GPU system, wherein the GPU system is configured to identify a solution to the operation execution request, 2) receive the solution to the operation execution request, 3) update the hash table to include the operation execution request and a second key corresponding to a location of the solution to the operation execution request, and 4) apply the solution to the operation execution request. In one or more examples, applying the solution may include training a large language model based on the solution.

In one or more instances, applying the solution may include sending, to a user device, an indication of the solution. In one or more instances, the location may be a distributed storage location.

In one or more examples, identifying the match may include identifying that a vector, corresponding to the operation, matches a vector in the hash table. In one or more examples, identifying the approximate match may include: 1) identifying a first vector, corresponding to the operation; 2) identifying a second vector in the hash table; 3) normalizing the first vector and the second vector to produce normalized vectors; 4) comparing values of the normalized vectors to produce a comparison score; 5) comparing the comparison score to a comparison threshold; and 6) based on identifying that the comparison score meets or exceeds the comparison threshold, identifying that the first vector and the second vector comprise the approximate match. In one or more examples, comparing the values may include comparing one or more of: Euclidian distances, cosine distances, a dot product, a manhattan value, or an L2 squared value.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
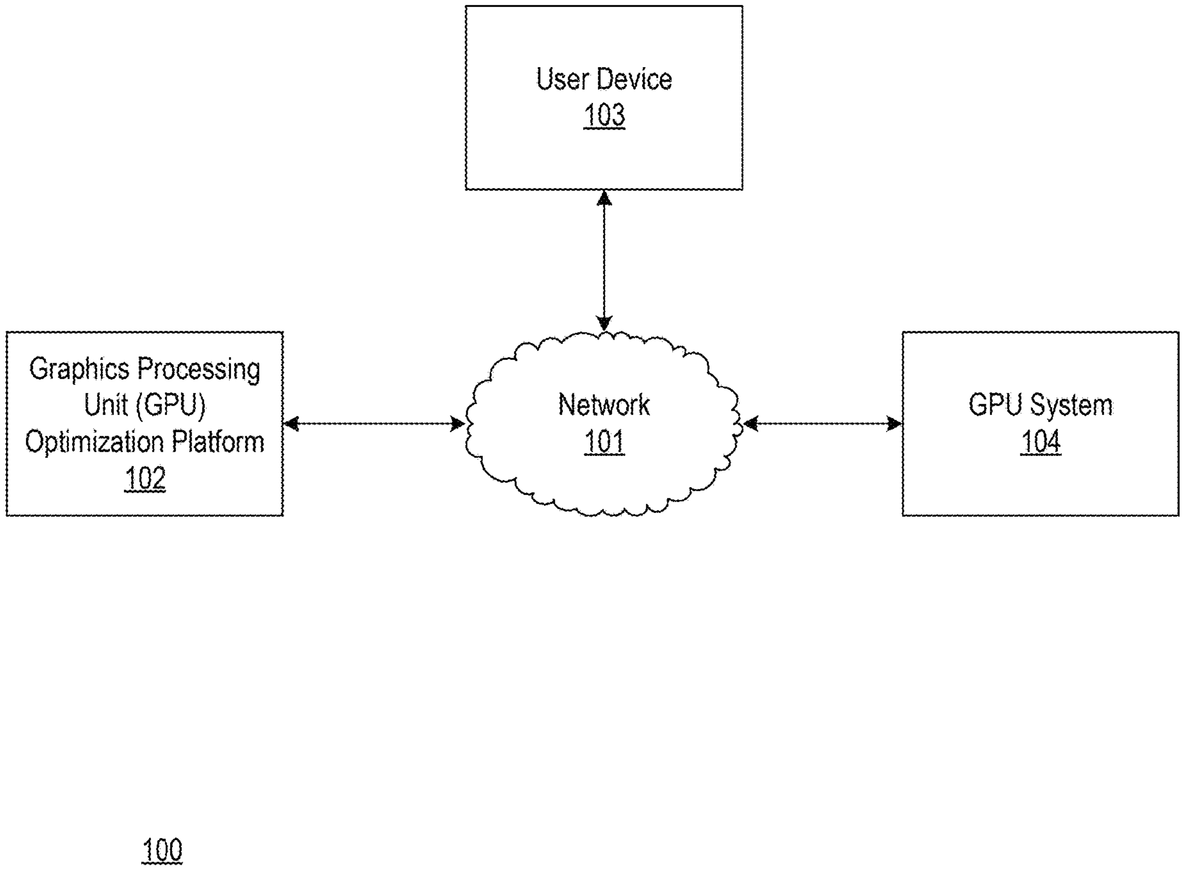
FIGS. 1A-1B depict an illustrative computing environment configured to optimize GPU processing using hash tables in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to leveraging hash tables to optimize GPU usage. More specifically, previously computed data may be cached, so it might not need to be recomputed. This cache may be stored in a hash table using a key. When the data is needed for any reason, the key may be used to retrieve the data and used accordingly. The hash table may be one of the most efficient (constant time or O(1)) data storage and retrieval processes, where data may be stored using a randomized key that may algorithmically ensure that the data is distributed almost uniformly over the hash table.

Traditional hash tables, however, may store data that is exact. AI models, on the other hand, may use approximate values. Accordingly, described herein is a hash table that may store approximate values. As described herein, in this hash table for approximate values, any two numbers may be considered the same if they are close enough to each other (e.g., within a threshold distance or value).

In GPU based computation, however, scalar numbers might not be used. Rather, vectors, which may be lists of different numbers, may be used. The numbers in these vectors may come from different parameters that may be used for computing optimal solutions. To compare each vector with another for closeness, each number in one vector may be compared to the corresponding number in another vector separately. However, such a method may be cumbersome. Accordingly, to compare one vector with another, each number may be normalized using the formula: (Max(x)−x)/(Max(x)−Min(x)), which may represent subtracting a given number from the vector maximum, and dividing it by the result of subtracting the vector minimum from the vector maximum. Once the vectors are normalized, Euclidean distance may be used to compare their differences. For example, Euclidian distance may be identified using the following formula:

$$\|x-y\| = \sum_{i=1}^{d}(x_i - y_i)^2,$$

where x represents a first vector, y represents a second vector, d represents a vector space, and i represents an initial point of the vector space. Additionally or alternatively, other metrics may be used to compare vectors distances, such as cosine distance, squared Euclidian, dot product, Manhattan distance (L1), or the like.

In some instances, the hash key may include all the parameters and their current values. When a job is submitted in the GPU bank, it may be determined, using the key, whether a corresponding value has already been pre-computed and exists in the hash table. If it exists, the existing approximate value may be used. Otherwise, the value may be submitted to the GPU bank to be computed. Then once the value is computed, it may be uploaded on the hash table for future use.

These and other features are described in further detail below.

Figure 1B:
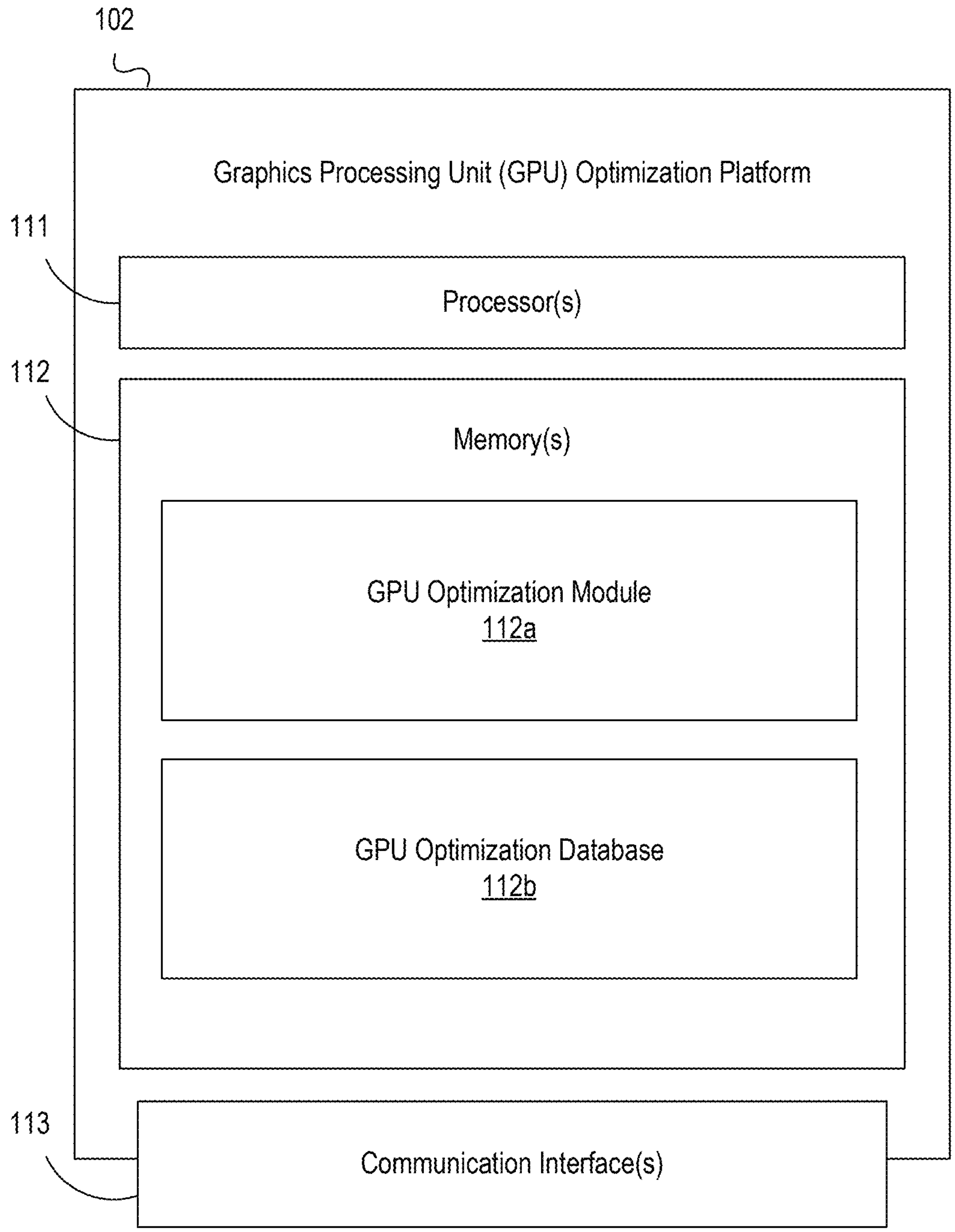

FIGS. 1A-1B depict an illustrative computing environment that optimizes GPU processing using hash tables in accordance with one or more example embodiments. Referring to FIG. 1A, computing environment 100 may include one or more computer systems. For example, computing environment 100 may include graphics processing unit (GPU) optimization platform 102, user device 103, and GPU system 104.

Graphics processing unit (GPU) optimization platform 102 may be a computer system that includes one or more computing devices (e.g., servers, server blades, or the like) and/or other computer components (e.g., processors, memories, communication interfaces) that may be used to generate, maintain, and/or otherwise utilize a hash table for storing operation/key pairs associated with GPU operations, which may, e.g., be referenced to identify whether or not a solution for a given operation has been pre-computed. In some instances, the GPU optimization platform 102 may itself include the one or more GPUs. In other instances, the GPUs may be separate from the GPU optimization platform 102 (e.g., GPU system 104). In some instances, the GPU optimization platform 102 may be configured to store, in a distributed manner, one or more pre-computed solutions to previously executed operations.

User device 103 may be and/or otherwise include one or more devices such as a laptop computer, desktop computer, mobile device, tablet, smartphone, and/or other device that may be used by an individual to submit requests to train and/or otherwise configure and/or otherwise interact with a generative AI model, LLM, and/or other model.

GPU system 104 may be and/or otherwise include one or more GPUs used to execute operations, such as operations associated with the training, configuration, processing, and/or maintenance of LLMs, generative AI models, and/or other models. In some instances, the GPU system 104 may be configured to store, in a distributed manner, one or more pre-computed solutions to previously executed operations.

Computing environment 100 also may include one or more networks, which may interconnect GPU optimization platform 102, user device 103, and GPU system 104. For example, computing environment 100 may include a network 101 (which may interconnect, e.g., GPU optimization platform 102, user device 103, and GPU system 104).

In one or more arrangements, GPU optimization platform 102, and GPU system 104 may be any type of computing device capable of sending and/or receiving requests and processing the requests accordingly. For example, GPU optimization platform 102, user device 103, GPU system 104, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of GPU optimization platform 102, user device 103, and GPU system 104 may, in some instances, be special-purpose computing devices configured to perform specific functions.

Referring to FIG. 1B, GPU optimization platform 102 may include one or more processors 111, memory 112, and communication interface 113. A data bus may interconnect processor 111, memory 112, and communication interface 113. Communication interface 113 may be a network interface configured to support communication between GPU optimization platform 102 and one or more networks (e.g., network 101, or the like). Memory 112 may include one or more program modules having instructions that when executed by processor 111 cause GPU optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of GPU optimization platform 102 and/or by different computing devices that may form and/or otherwise make up GPU optimization platform 102. For example, memory 112 may have, host, store, and/or include GPU optimization module 112*a* and GPU optimization database 112*b*.

GPU optimization module 112*a* may store and/or otherwise execute one or more instructions that may cause the GPU optimization platform 102 to execute advanced techniques to optimize the performance of GPUs, as is described further herein. GPU optimization database 112*b* may store a hash table that may include correlations between operations and corresponding keys, which may, e.g., be used to identify a distributed location of a pre-computed solution to an operation, as is described further herein.

Figure 2A:
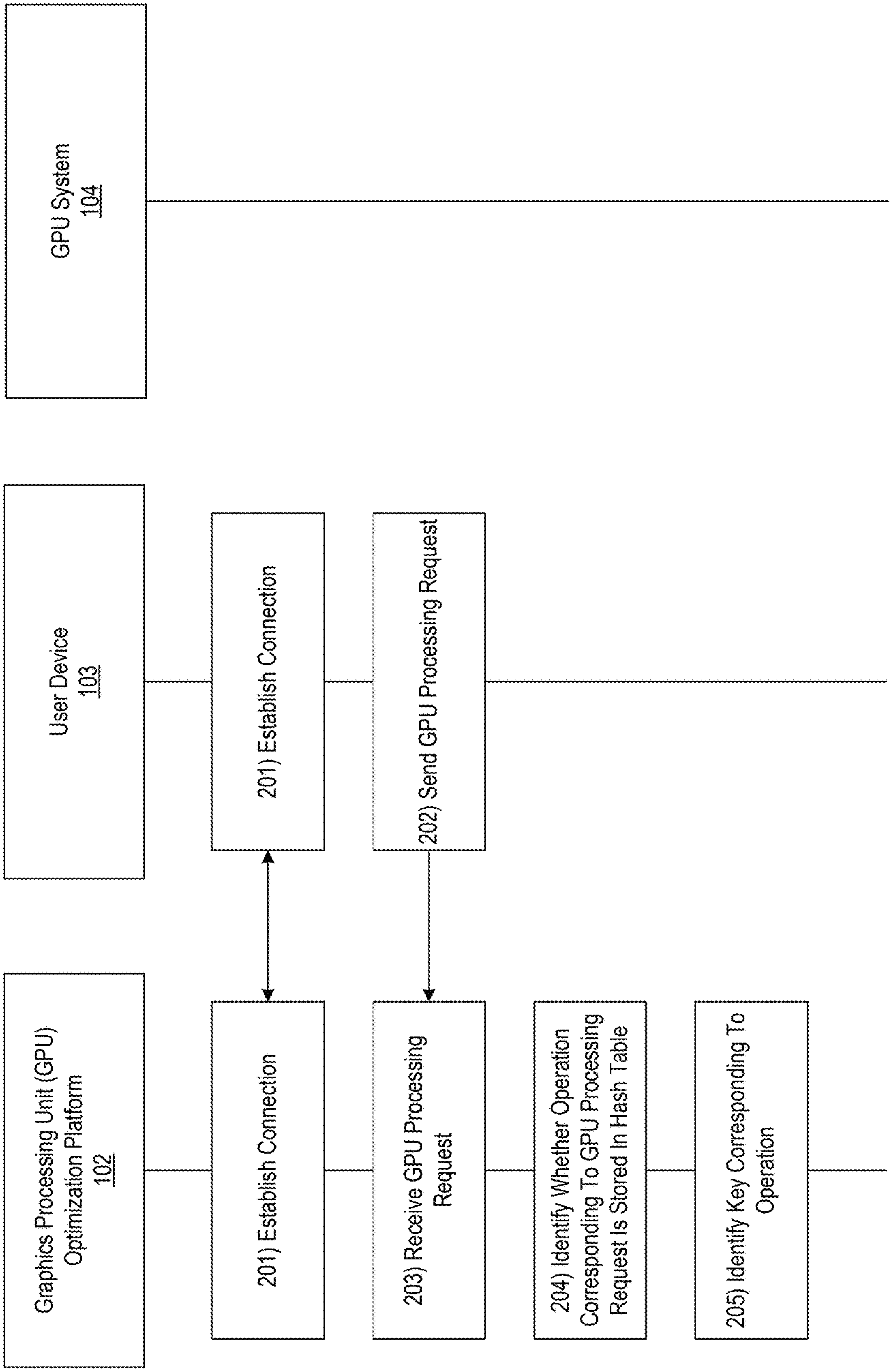
FIGS. 2A-2D depict an illustrative event sequence for optimizing GPU processing using hash tables in accordance with one or more example embodiments.

FIGS. 2A-2D depict an illustrative event sequence for optimizing GPU processing using hash tables in accordance with one or more example embodiments. Referring to FIG. 2A, at step 201, the user device 103 may establish a connection with the GPU optimization platform 102. For example, the user device 103 may establish a first wireless data connection with the GPU optimization platform 102 (e.g., in preparation for sending GPU processing requests). In some instances, the user device 103 may identify whether a connection is already established with the GPU optimization platform 102. If a connection is already established with the GPU optimization platform 102, the user device 103 might not re-establish the connection. Otherwise, if a connection is not yet established with the GPU optimization platform 102, the user device 103 may establish the first wireless data connection as described herein.

At step 202, the user device 103 may send a GPU processing request to the GPU optimization platform 102. For example, the user device 103 may send a request to train and/or otherwise apply an AI model, LLM, and/or other model. In some instances, the user device 103 may send the GPU processing request to the GPU optimization platform 102 while the first wireless data connection is established.

At step 203, the GPU optimization platform 102 may receive the GPU processing request sent at step 202. For example, the GPU optimization platform 102 may receive the GPU processing request via the communication interface 113 and while the first wireless data connection is established.

At step 204, the GPU may identify whether one or more operations corresponding to the GPU processing request are stored in a hash table. For example, in some instances, the operations may correspond to multiplication of vectors corresponding to model parameters, or the like. In some instances, the hash table may be preconfigured to include a plurality of operations and corresponding keys. In these instances, each of the plurality of operations may be pre-computed by GPUs (e.g., GPU system 104) to produce corresponding solutions, which may be stored at the GPU optimization platform 102, GPU system 104, and/or in other locations using a distributed storage scheme. Accordingly, the corresponding keys may indicate a storage location of a solution for a corresponding operation.

Thus, the GPU optimization platform 102 may identify whether or not the operations corresponding to the GPU processing request have already been pre-computed by searching for the operations in the hash table. If the operations are included in the hash table, the GPU optimization platform 102 may proceed to step 205. Otherwise, if the operations are not included in the hash table, the GPU optimization platform 102 may proceed to step 208 in FIG. 2B.

At step 205, the GPU optimization platform 102 may identify keys corresponding to the one or more operations of the GPU processing request. For example, the keys may be stored in the hash table in a way that notes that they are associated with a particular operation. As noted above, each key may indicate a distributed location of the corresponding operation solution.

Figure 2B:
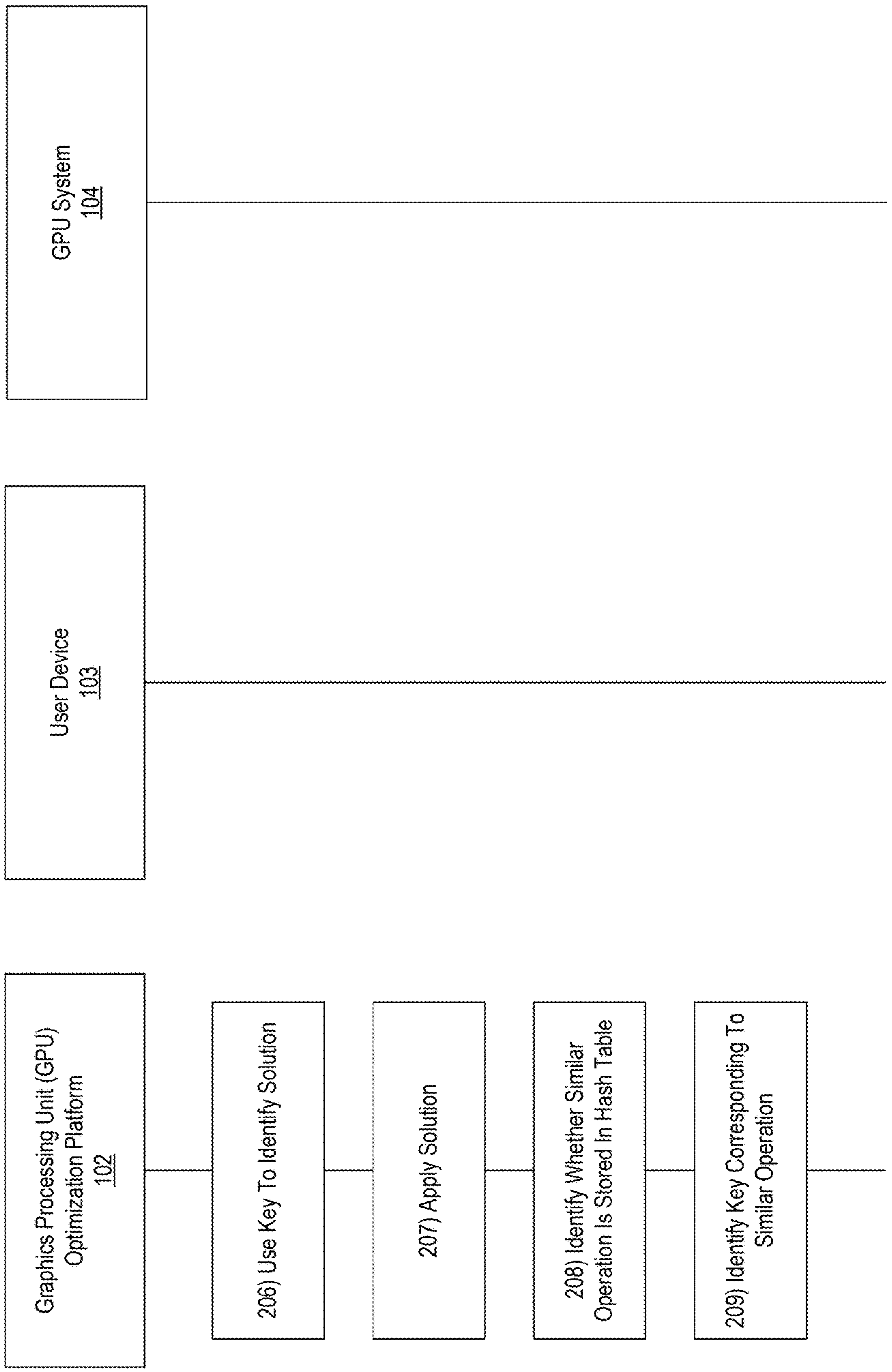

Referring to FIG. 2B, at step 206, the GPU optimization platform 102 may identify the corresponding solutions by accessing the storage locations indicated by the identified keys. In some instances, this may involve obtaining the solutions from the GPU optimization platform 102 itself, the GPU system 104, and/or other systems. In doing so, the GPU optimization platform 102 may identify solutions without the need to compute such solutions using one or more GPUs (e.g., because they have been previously computed and cached for future use). Doing so may conserve processing resources of the GPU system 104.

At step 207, the GPU optimization platform 102 may apply the identified solution. For example, the GPU optimization platform 102 may use the solution to provide a response from the model (e.g., a text based response, image response, audio response, or the like), train a model, and/or perform other functions. In some instances, the GPU optimization platform 102 may send a notification of the identified solution to the user device 103. Subsequently the event sequence may end.

Returning to step 204, if the GPU optimization platform 102 identified that one or more operations were not stored in the hash table, the GPU optimization platform 102 may have proceeded to step 208. At step 208, the GPU optimization platform 102 may identify whether a similar operation is stored in the hash table. For example, to do so, the GPU optimization platform 102 may generate a comparison score between a first operation (e.g., the operation corresponding to the GPU processing request) and one or more second operations (e.g., the operations stored in the hash table). To do so, the GPU optimization platform 102 may identify a first vector corresponding to the first operation and one or more second vectors corresponding to the one or more second operations. The GPU optimization platform 102 may normalize these vectors to produce normalized vectors. For example, the GPU optimization platform 102 may normalize the vectors using the following equation: (Max(x)−x)/(Max(x)−Min(x)), which may represent subtracting a given number from the vector maximum, and dividing it by the result of subtracting the vector minimum from the vector maximum.

The GPU optimization platform 102 may then compare values of these normalized vectors to produce the comparison score, which may, e.g., indicate how similar the vectors are based on a relative distance between the vectors. In some instances, in comparing the values, the GPU optimization platform 102 may compare a Euclidian distance between the vectors (e.g., using the following formula:

$$\|x-y\| = \sum_{i=1}^{d}(x_i - y_i)^2,$$

where x represents a first vector, y represents a second vector, d represents a vector space, and i represents an initial point of the vector space). Additionally or alternatively, other metrics may be used to compare vectors distances, such as cosine distance, squared Euclidian, dot product, Manhattan distance (L1), or the like.

Once the comparison is performed and a comparison score is generated (e.g., with a higher score indicating a higher likelihood of similarity (e.g., represented by a lower distance between vectors) and a lower score indicating a lower likelihood of similarity), the comparison score may be compared to a threshold value. If the GPU optimization platform 102 identifies that the comparison score meets or exceeds the threshold value, the GPU optimization platform 102 may identify that the corresponding operations are an approximate match, and may proceed to step 209. Otherwise, if the comparison score does not meet or exceed the threshold value, the GPU optimization platform 102 may identify that the corresponding operations are not an approximate match and may proceed to step 212 in FIG. 2C.

At step 209, the GPU optimization platform 102 may identify, using the above referenced hash table, the key corresponding to the operation identified as an approximate match (which may, e.g., represent an approximate key). For example, the GPU optimization platform 102 may identify the approximate key using techniques similar to those described above with regard to step 205.

Figure 2C:
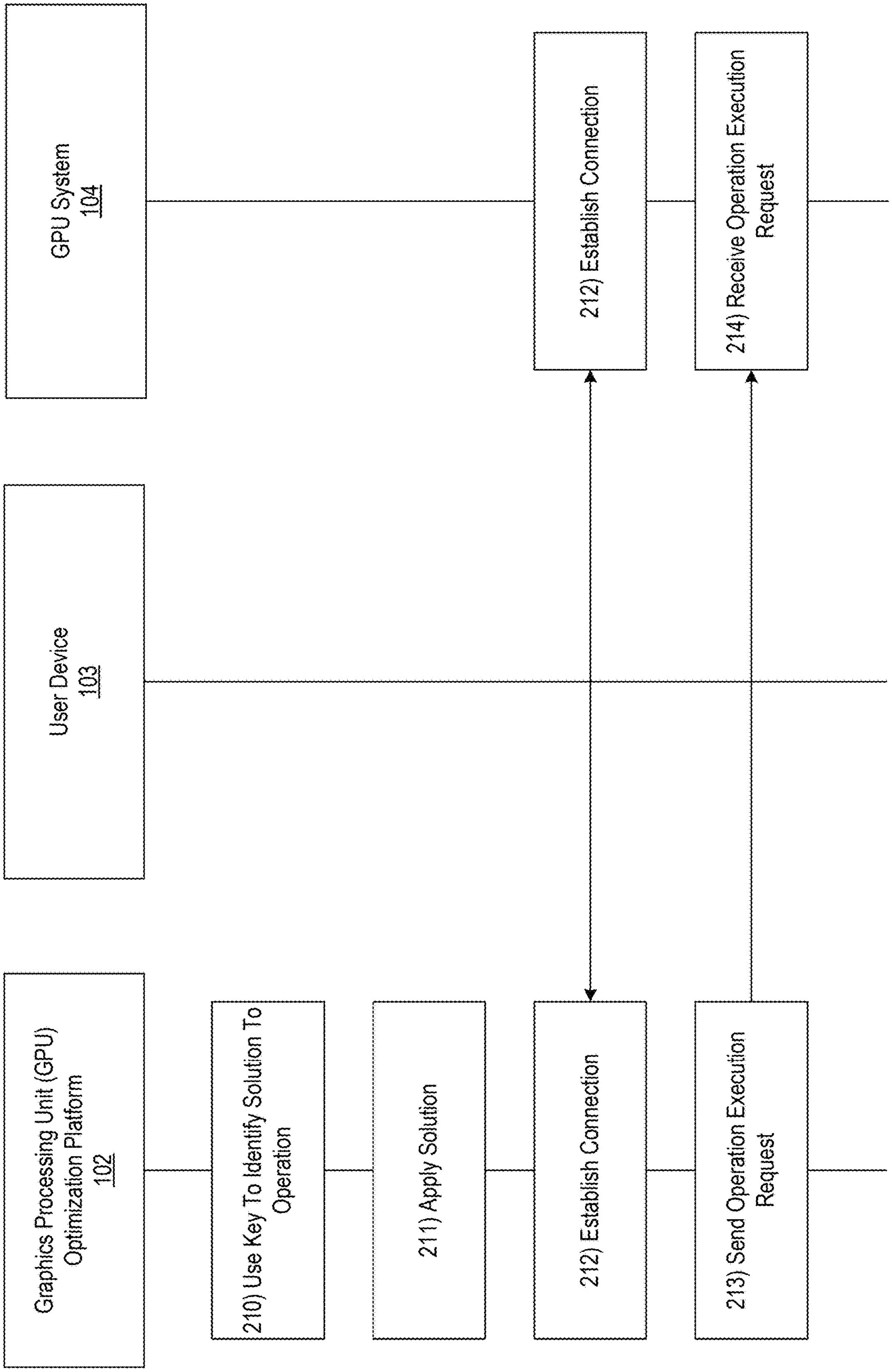
Figure 2D:
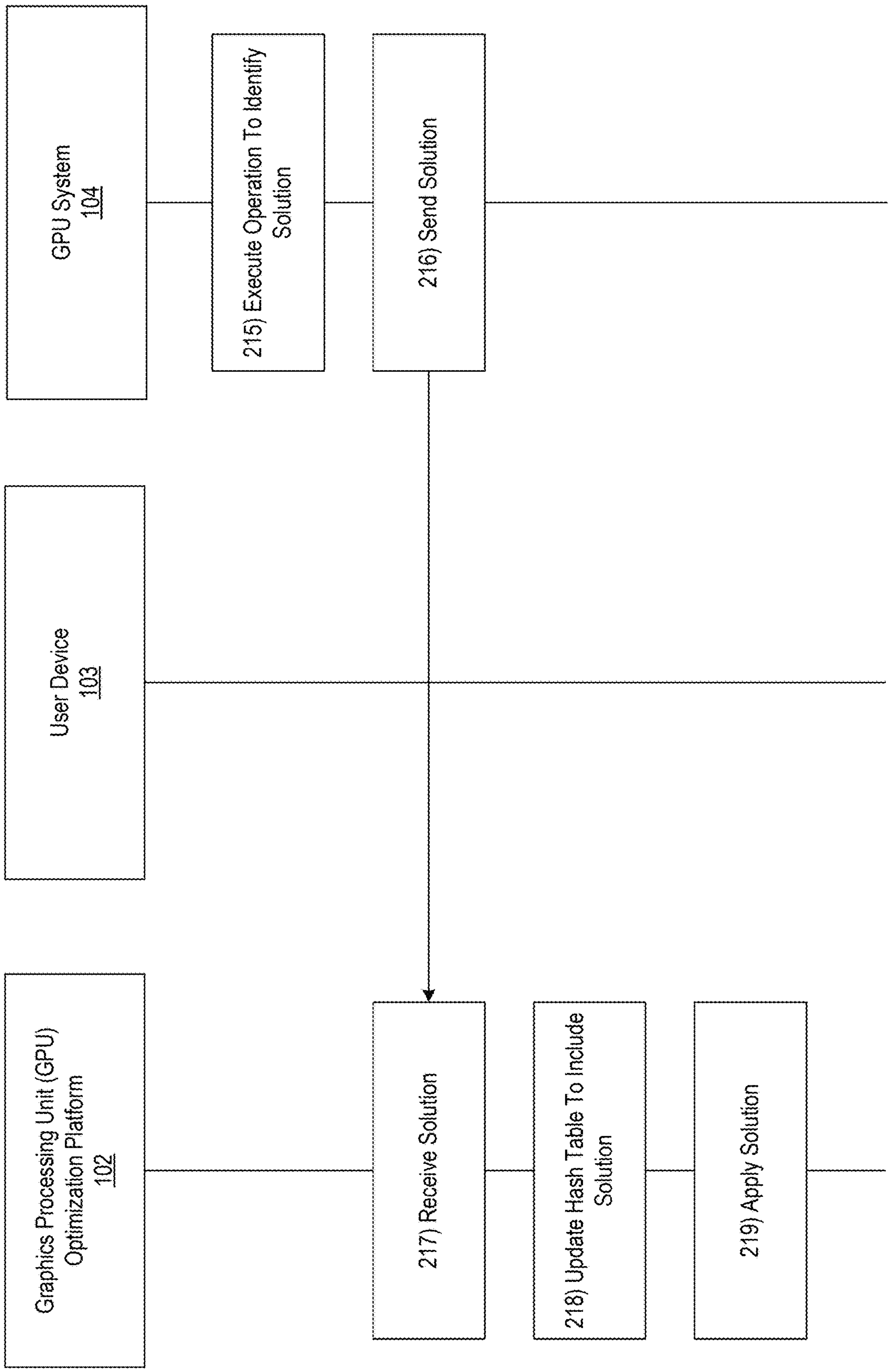

Referring to FIG. 2C, at step 210, the GPU optimization platform 102 may identify, using the approximate key, an approximate solution. For example, the GPU optimization platform 102 may identify the approximate solution using techniques similar to those described above with regard to step 206. More specifically, the GPU optimization platform 102 may identify a solution for an operation/vector that is an approximate match to the operation/vector corresponding to the GPU processing request. The idea being that because the similarity between the vectors is above the predetermined threshold, the corresponding solutions may similarly be approximate matches. Similar to the processing efficiencies described above at step 206, by identifying solutions that comprise approximate matches with sufficient similarity to that of an initially desired solution, processing resources of the GPU system 104 may be conserved (e.g., because a pre-computed cached solution may be retrieved rather than using the GPU system 104 to compute a new solution).

At step 211, the GPU optimization platform 102 may apply the approximate solution. For example, the GPU optimization platform 102 may perform techniques similar to those described above with regard to step 207. Subsequently the event sequence may end.

Returning to step 208, if the GPU optimization platform 102 identified that there was no approximate match between the vectors, the GPU optimization platform 102 may have proceeded to step 212. At step 212, the GPU optimization platform 102 may establish a connection with the GPU system 104. For example, the GPU optimization platform 102 may establish a second wireless data connection with the GPU system 104 to link the GPU optimization platform 102 with the GPU system 104 (e.g., in preparation for submitting operation execution requests). In some instances, the GPU optimization platform 102 may identify whether or not a connection is already established with the GPU system 104. If a connection is not yet established with the GPU system 104, the GPU optimization platform 102 may establish the second wireless data connection as described herein. If a connection is already established with the GPU system 104, the GPU optimization platform 102 might not re-establish the connection.

At step 213, the GPU optimization platform 102 may send the operation execution request to the GPU system 104. For example, the GPU optimization platform 102 may send the operation execution request to the GPU system 104 via the communication interface 113 and while the second wireless data connection is established. For example, in sending the operation execution request to the GPU system 104, the GPU optimization platform 102 may send the one or more operations corresponding to the GPU processing request for processing (e.g., as an alternative to selecting a pre-computed exact or approximate solution, as is described above).

At step 214, the GPU system 104 may receive the operation execution request sent at step 213. For example, the GPU system 104 may receive the operation execution request while the second wireless data connection is established.

Referring to FIG. 2C, at step 215, the GPU system 104 may execute the operation to identify a solution. For example, the GPU system 104 may perform a plurality of vector multiplications, matrix multiplications, and/or other operations. In addition or as an alternative to executing these operations at a separate GPU system 104, the GPU optimization platform 102 may perform these operations.

At step 216, the GPU system 104 may send the solution to the GPU optimization platform 102. For example, the GPU system 104 may send the solution to the GPU optimization platform 102 while the second wireless data connection is established.

At step 217, the GPU optimization platform 102 may receive the solution sent at step 216. For example, the GPU system 104 may receive the solution via the communication interface 113 and while the second wireless data connection is established.

At step 218, the GPU optimization platform 102 may update the hash table to include the solution received at step 216 and the corresponding operation. In doing so, the GPU optimization platform 102 may dynamically update the table to provide processing efficiencies in the event that the operation is received again at a later time (e.g., in which case, the solution will now be cached for retrieval).

At step 219, the GPU optimization platform 102 may apply the solution. For example, the GPU optimization platform 102 may perform techniques similar to those described above with regard to step 207 and/or 211. Subsequently the event sequence may end.

Figure 3:
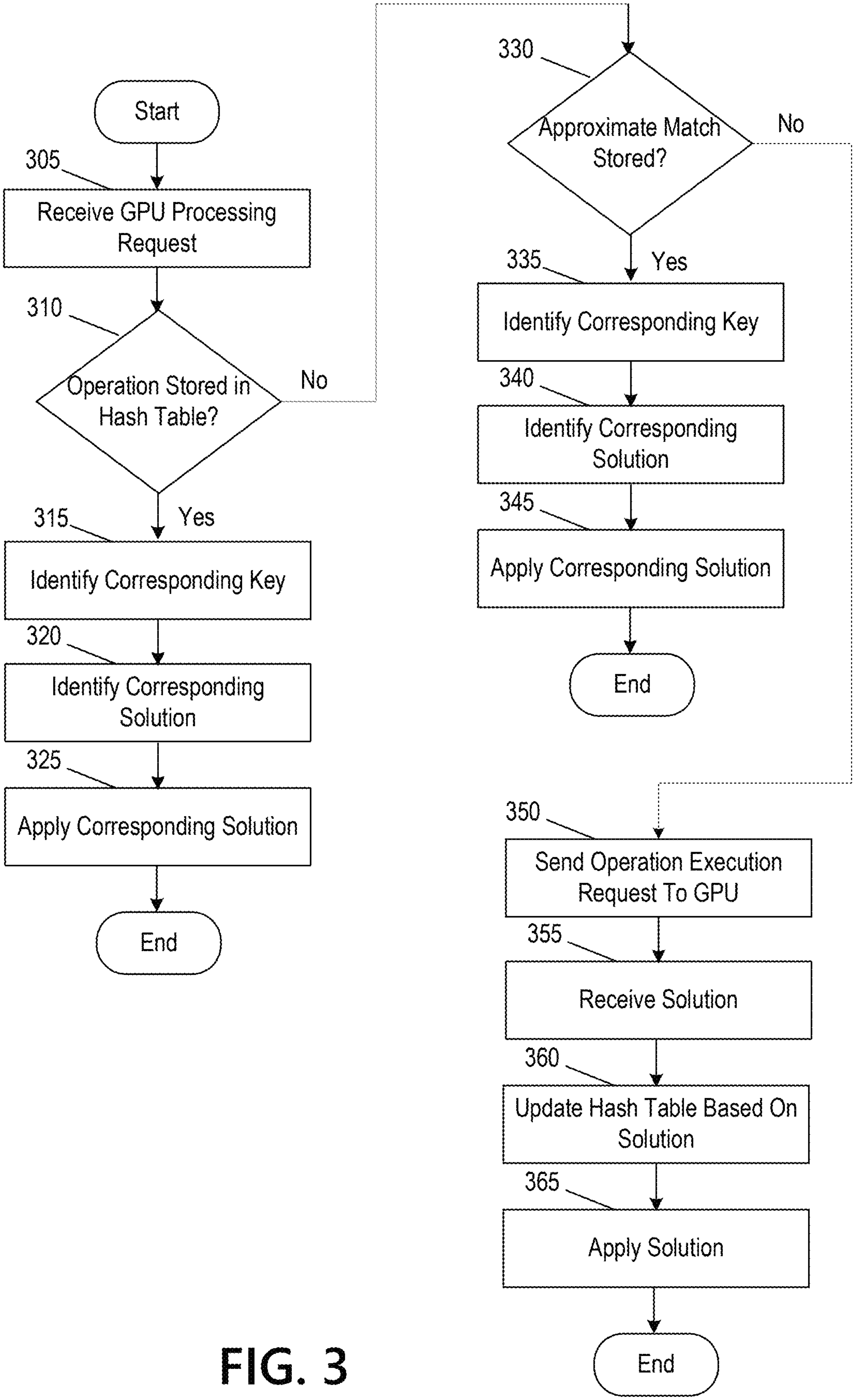
FIG. 3 depicts an illustrative method for optimizing GPU processing using hash tables in accordance with one or more example embodiments.

FIG. 3 depicts an illustrative method for optimizing GPU processing using hash tables in accordance with one or more example embodiments. Referring to FIG. 3, at step 305, a computing platform having at least one processor, a communication interface, and memory may receive a GPU processing request. At step 310, the computing platform may identify whether or not the corresponding operations are stored in a hash table. If the operations are stored in the hash table, the computing platform may proceed to step 315.

At step 315, the computing platform may identify, using the hash table, keys corresponding to the operations. At step 320, the computing platform may retrieve solutions corresponding to the operations by identifying a location of the solutions using the keys. At step 325, the computing platform may apply the corresponding solutions.

Returning to step 310, if the operations are not stored in the hash table, the computing platform may proceed to step 330. At step 330, the computing platform may identify whether an approximate operation match is identified in the hash table. If an approximate match is identified, the computing platform may proceed to step 335.

At step 335, the computing platform may identify a key for the corresponding approximate match operation. At step 340, the computing platform may retrieve solutions corresponding to the approximate match operations by identifying locations of these solutions using the keys. At step 345, the computing platform may apply the corresponding solutions.

Returning to step 330, if an approximate match is not identified, the computing platform may proceed to step 350. At step 350, the computing platform may send the operations for execution by one or more GPUs. At step 355, the computing platform may receive solutions from the one or more GPUs. At step 360, the computing platform may update the hash table based on the solutions received at step 355. At step 365, the computing platform may apply the solutions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
  receive a graphics processing unit (GPU) processing request for processing by a GPU system;
  identify an operation requested by the GPU processing request;
  identify whether or not the operation is stored in a hash table, wherein the hash table stores a plurality of operations and corresponding keys, and wherein each key indicates a distributed storage location of a pre-generated solution to a corresponding operation;
  based on identifying that the operation is not stored in the hash table, identify whether an approximate match of the operation is stored in the hash table;
  based on identifying that the approximate match is stored in the hash table, identify a first key stored, in the hash table, along with the approximate match;
  based on identifying that the approximate match is not stored in the hash table:
    send an operation execution request to the GPU system, wherein the GPU system is configured to identify a solution to the operation execution request,
    receive the solution to the operation execution request,
    update hash table to include the operation execution request and a second key corresponding to a location of the solution to the operation execution request, and
    apply the solution to the operation execution request, wherein applying the solution comprises:
      training a large language model based on the solution, and
      sending, to a user device, an indication of the solution, wherein:
      identifying the match comprises identifying that a vector, corresponding to the operation, matches a vector in the hash table, and
      identifying the approximate match comprises:
        identifying a first vector, corresponding to the operation;
        identifying a second vector in the hash table;
        normalizing the first vector and the second vector to produce normalized vectors;
        comparing values of the normalized vectors to produce a comparison score;
        comparing the comparison score to a comparison threshold; and
        based on identifying that the comparison score meets or exceeds the comparison threshold, identifying that the first vector and the second vector comprise the approximate match, wherein comparing the values comprises comparing one or more of: Euclidian distances, cosine distances, a dot product, a manhattan value, or an L2 squared value;
  identify, using the first key, the distributed storage location of the pre-generated solution to the approximate match of the operation;
  obtain, from the distributed storage location, the pre-generated solution to the approximate match of the operation; and
  apply the solution.

2. The computing platform of claim 1, wherein the hash table is pre-populated with the plurality of operations and corresponding solution keys.

3. The computing platform of claim 1, wherein the memory stores additional computer-readable instructions that, when executed by the at least one processor, cause the computing platform to:

based on identifying that the operation is stored in the hash table, identify a second key stored, in the hash table, along with the matching operation.

4. The computing platform of claim 1, wherein comparing the values comprises comparing: Euclidian distances, cosine distances, a dot product, a manhattan value, and an L2 squared value.

5. The computing platform of claim 1, wherein the operation comprises multiplication of vectors corresponding to model parameters.

6. The computing platform of claim 1, wherein normalizing the first vector and the second vector comprises, for each number in the first vector and the second vector, subtracting the number from a vector maximum and dividing by a result of subtracting a vector minimum from the vector maximum.

7. The computing platform of claim 1, wherein a hash key corresponding to the operation includes all parameters of the operation and current values of the parameters.

8. A method comprising:

at a computing platform comprising at least one processor, a communication interface, and memory:

receiving a graphics processing unit (GPU) processing request for processing by a GPU system;

identifying an operation requested by the GPU processing request;

identifying whether or not the operation is stored in a hash table, wherein the hash table stores a plurality of operations and corresponding keys, and wherein each key indicates a distributed storage location of a pre-generated solution to a corresponding operation;

based on identifying that the operation is not stored in the hash table, identifying whether an approximate match of the operation is stored in the hash table;

based on identifying that the approximate match is stored in the hash table, identifying a first key stored, in the hash table, along with the approximate match;

based on identifying that the approximate match is not stored in the hash table:

sending an operation execution request to the GPU system, wherein the GPU system is configured to identify a solution to the operation execution request, receiving the solution to the operation execution request, updating hash table to include the operation execution request and a second key corresponding to a location of the solution to the operation execution request, and applying the solution to the operation execution request, wherein applying the solution comprises:

training a large language model based on the solution, and sending, to a user device, an indication of the solution, wherein:

identifying the match comprises identifying that a vector, corresponding to the operation, matches a vector in the hash table, and identifying the approximate match comprises:

identifying a first vector, corresponding to the operation;

identifying a second vector in the hash table;

normalizing the first vector and the second vector to produce normalized vectors;

comparing values of the normalized vectors to produce a comparison score;

comparing the comparison score to a comparison threshold; and based on identifying that the comparison score meets or exceeds the comparison threshold, identifying that the first vector and the second vector comprise the approximate match, wherein comparing the values comprises comparing one or more of: Euclidian distances, cosine distances, a dot product, a manhattan value, or an L2 squared value;

identifying, using the first key, the distributed storage location of the pre-generated solution to the approximate match of the operation;

obtaining, from the distributed storage location, the pre-generated solution to the approximate match of the operation; and applying the solution.

9. The method of claim 8, wherein the hash table is pre-populated with the plurality of operations and corresponding solution keys.

10. The method of claim 8, further comprising:

based on identifying that the operation is stored in the hash table, identifying a second key stored, in the hash table, along with the matching operation.

11. One or more non-transitory computer-readable media storing instructions that, when executed by a computing platform comprising at least one processor, a communication interface, and memory, cause the computing platform to:

receive a graphics processing unit (GPU) processing request for processing by a GPU system;

identify an operation requested by the GPU processing request;

identify whether or not the operation is stored in a hash table, wherein the hash table stores a plurality of operations and corresponding keys, and wherein each key indicates a distributed storage location of a pre-generated solution to a corresponding operation;

based on identifying that the operation is not stored in the hash table, identify whether an approximate match of the operation is stored in the hash table;

based on identifying that the approximate match is stored in the hash table, identify a first key stored, in the hash table, along with the approximate match;

based on identifying that the approximate match is not stored in the hash table:

send an operation execution request to the GPU system, wherein the GPU system is configured to identify a solution to the operation execution request, receive the solution to the operation execution request, update hash table to include the operation execution request and a second key corresponding to a location of the solution to the operation execution request, and apply the solution to the operation execution request, wherein applying the solution comprises:

training a large language model based on the solution, and sending, to a user device, an indication of the solution, wherein:

identifying the match comprises identifying that a vector, corresponding to the operation, matches a vector in the hash table, and identifying the approximate match comprises:

identifying a first vector, corresponding to the operation;

identifying a second vector in the hash table;

normalizing the first vector and the second vector to produce normalized vectors;

comparing values of the normalized vectors to produce a comparison score;

comparing the comparison score to a comparison threshold; and based on identifying that the comparison score meets or exceeds the comparison threshold, identifying that the first vector and the second vector comprise the approximate match, wherein comparing the values comprises comparing one or more of: Euclidian distances, cosine distances, a dot product, a manhattan value, or an L2 squared value;

identify, using the first key, the distributed storage location of the pre-generated solution to the approximate match of the operation;

obtain, from the distributed storage location, the pre-generated solution to the approximate match of the operation; and apply the solution.

* * * * *